April 7, 1970  I. A. HADDAD  3,504,664

SENSING ELEMENT SUPPORT

Filed Dec. 17, 1965

United States Patent Office 3,504,664
Patented Apr. 7, 1970

3,504,664
SENSING ELEMENT SUPPORT
Ihsan A. Haddad, Brighton, Mass., assignor to Instrumentation Laboratory, Inc., a corporation of Massachusetts
Filed Dec. 17, 1965, Ser. No. 514,727
Int. Cl. A61b 5/05
U.S. Cl. 128—2.1    15 Claims

ABSTRACT OF THE DISCLOSURE

A support structure for a miniature polarographic cell (0.002" diameter cathode) suitable for $pO_2$ measurements of brain tissue under the skull includes a stainless steel support disc ⅜" in diameter and 0.110" thick. The sensing cell is exposed at one side of the disc and a diaphragm is secured over the opposite side. A passage through the disc, in which the cell leads are disposed allows the diaphragm to be inflated. The construction permits sterilization and positive positioning of the cell in the desired measurement location.

---

This invention relates to apparatus for sensitive electrode measurements in remote positions.

Frequently it is desired, particularly in a physiological context, to make remote electrode measurements of a condition with a highly sensitve electrode where there is no satisfactory way to secure the electrode in position. This problem is particularly acute where the position of the electrode as well as its sensitivity to pressure and temperature make manual manipulation impractical. The problem is aggravated where limitations are placed upon the size of such an electrode. The present invention is directed to the solution of these problems.

It is a prime object of this invention to provide means for securing a sensitive electrode, such as a miniature polarographic cell, in a remote position between layers of materials, one of which is to be sensed.

Another object of this invention is to provide means to protect a sensitive electrode while maintaining the sensing portion in a secured position relative to material to be sensed.

In general the invention features a suport member having opposed surfaces. A sensing element is secured to the support member and has a sensing portion adjacent one of the opposed surfaces. The other of the surfaces is adapted to have a resilient member secured thereto to form a chamber between the resilient member and the support member. A passage from the chamber extends through the support member whereby pressurized fluid may be introduced to the chamber to expand the resilient member. Additionally, in the preferred form of this invention, a tubular member is secured to the passage and extends to connector means at a position remote from the support member. The connector means includes an opening for connection to a pressure source and also includes terminals for connection to power and monitoring means. Leads from the sensing element extend through the passage and the tubular member to the connector means terminals.

Other objects, features and advantages of the invention will be apparent to those skilled in the art from the following detailed description thereof together with the accompanying drawings in which.

Figure 1:
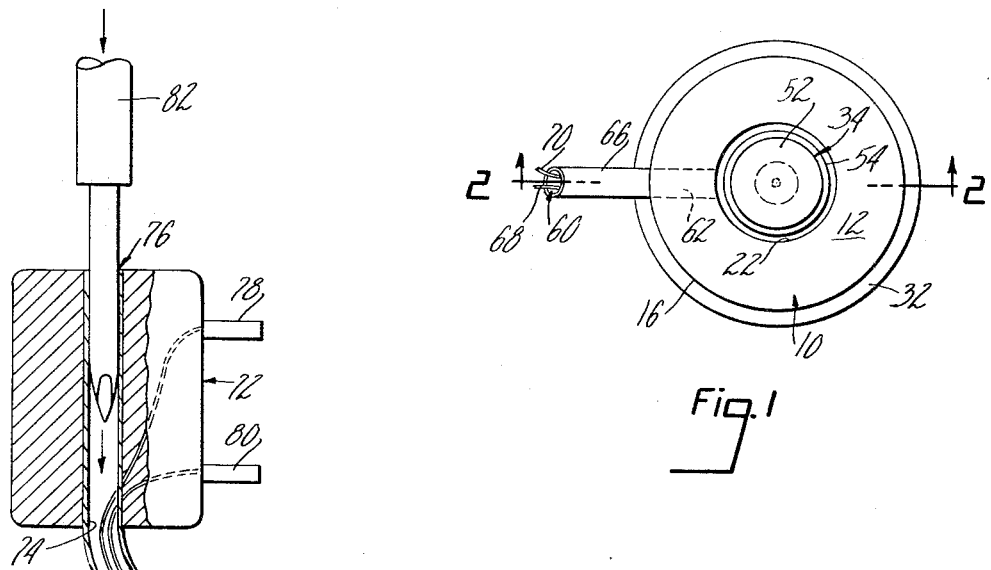
FIG. 1 is a plan view of an embodiment of this invention.
Figure 2:
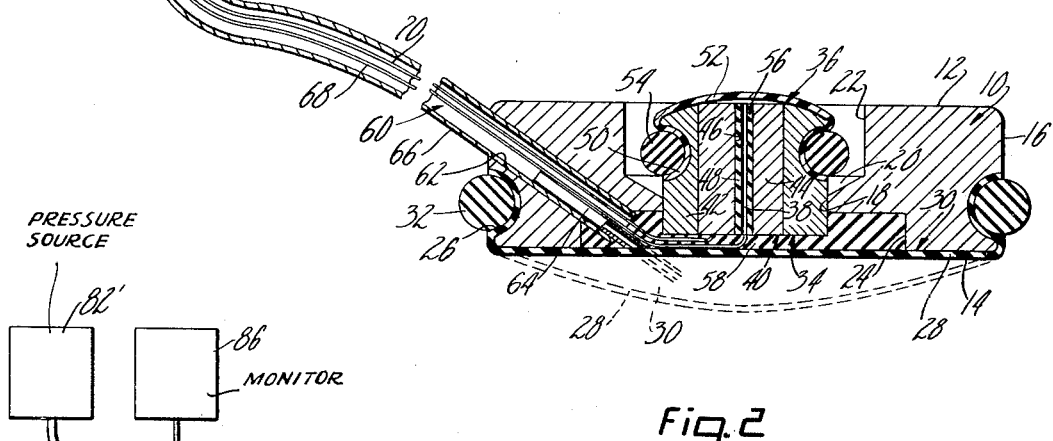
FIG. 2 is an enlarged sectional view along the line 2—2 of FIG. 1 and of associated apparatus connected thereto.

Having reference now to FIGS. 1 and 2 of the drawings, a disc shaped suupport member 10, preferably of stainless steel, having first and second opposed surfaces 12, 14 and a wall 16 thereabout, is provided with a coaxial bore 18 therethrough. In the miniature sensing apparatus for which this invention is designed to have its greatest utility, typical dimensions of the support are: disc 10 diameter 0.375"; disc height at wall 16 0.110"; and bore 18 diameter 0.125".

A first counterbore 22, coaxial with bore 18 and having a diameter of 0.180", extends from the first surface 12 into the support a distance of 0.040". A second counterbore 24, also coaxial with bore 18, having a diameter of 0.240" and a depth of 0.030", extends into support 10 from the second surface. A countersink 20 is preferably provided at the base of counterbore 22.

A resilient membrane 28, preferably of an elastomeric material such as rubber, is secured across the second surface 14 to form a chamber 30 between the resilient membrane 28 and support 10. In the preferred embodiment groove 26, extending about wall 16 adjacent the second surface 14, is provided for securing the membrane 28 to the support 10. An O-ring 32 is positioned in groove 26 overlying membrane 28 to retain the membrane therein.

A sensing element 34 is secured to support 10 in a press fit in the bore 18. The sensing portion 36 of element 34 is disposed adjacent first surface 12 substantially in the plane thereof. The opposite end of element 34 is disposed in second counterbore 24 recessed from second surface 14. In its preferred form, element 34 is a cylindrical polarographic cell having an axially positioned gold cathode wire 38 of 0.002" diameter. The anode 40 of cell 34 comprises a two part device: an outer stainless steel sleeve 42, having an outer diameter of 0.125" and an inner diameter of 0.060"; and an inner silver sleeve 44 having an outer diameter of 0.060" fitted in a press fit in sleeve 42. Cathode 38 is in a bore 46 in sleeve 44 and is spaced therefrom by an epoxy resin insulation 48. The sensing portion 36 is of a generally parabolic configuration adjacent first surface 12.

Groove 50 is provided around anode 40 in first counterbore 22. A membrane 52 of material pervious to the substance to be measured and impervious to other substances, e.g. polytetrafluoroethylene or polypropylene in the case of $pO_2$ measurements, extends across the sensing portion 36 at which the anode 40 and cathode 38 are exposed and into groove 50. O-ring 54 overlying the membrane 52 in groove 50 secures the membrane in place. An electrolyte medium 56 providing an electrical bridge between anode 40 and cathode 38 is secured and protected on the sensing portion 36 beneath membrane 52.

An insulating seal 58 is positioned in the second counterbore 24 to form a seal between the second surface 14 and adjacent walls of bore 18 and element 34, and preferably extends entirely thereacross flush with second surface 14. The seal 58 is preferably formed in situ of epoxy resin insulation after connection of the sensing element 34 to electrical leads and after provision of an air passage to chamber 30 as hereinafter described.

A passage 60 is provided through support 10 for passage therethrough of pressurized fluid to chamber 30. In the preferred embodiment, the passage is provided via drilled hole 62, capillary tube 64 and tube 66.

Drilled hole 62 extends from a position on wall 16 between first surface 12 and groove 26, to avoid interference with the first surface 12, to a position in the second counterbore 24 spaced from bore 18, to avoid interference with element 34. Of course, hole 62 is spaced from first counterbore 22 and that portion of bore 18 which is unsealed. Typically hole 62 will have a diameter of 0.030".

Tube 66 extends through hole 62 from a position remote from the support 10 to second counterbore 24. Preferably, tube 66 just enters the second counterbore 24 sufficiently to have its end sealed by seal 58, the tube being placed in the second counterbore prior to the formation of the seal. In the preferred embodiment, the tube is of irradiated polyvinyl chloride or silicone coated fiberglass and has a diameter larger than that of hole 62, i.e. 0.035". To place the tube 66 in hole 62 the tube outer diameter is reduced by stretching the tube. The tube is then placed in the hole and heated to restore its diameter.

After insertion of the tube 66 in support 10, capillary tube 64 is placed in tube 66 a distance sufficient to insure that it will not be blocked by the seal 58 as it is formed. Initially, the capillary tube 64 also extends beyond the second surface 14 as shown by the broken lines in FIG. 2 subsequently being ground to the second surface 14 plane after formation of seal member 58.

Leads 68, 70 to cathode 38 and anode 40 respectively extend thereto through tube 66. The leads are positioned below the plane of the second surface 14 in seal 58, also being positioned before formation of the seal.

From support 10, tube 66 and leads 68, 70 extend to remote connector 72 connected thereto and adapted for connection to a fluid pressure source, and power and monitoring means. The remote connector 72 includes a hole 74 into which tube 66 is secured and an opening 76 thereto for connection to the pressure source. Also included are terminals 78, 80 for connection to the power and monitoring means. Leads 68, 70 extend through a wall of tube 66, at and through the remote connector 72 to terminals 78, 80 and are connected to the terminals.

Figure 3:
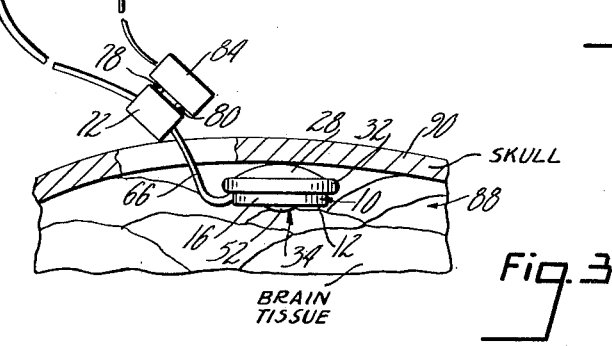
FIG. 3 is a reduced diagrammatic representation of the apparatus in use.

In operation, membrane 28 and O-ring 32 are first assembled on support 10. Electrolyte 56 is then placed on the sensing portion 36 of element 34 and pervious membrane 52 and O-ring 54 secured thereacross. If desired, the entire assembly may then be sterilized. First surface 12 and sensing portion 36 are then placed adjacent the material to be measured as in FIG. 3 adjacent brain tissue 88 for, e.g., $pO_2$ measurements thereof under the skull 90. The remote connector 72 is then connected to a pressure source which may comprise a syringe 82, FIG. 2, with a valve (not shown) or some other suitable pressure source 82', FIG. 3 and pressurized fluid, e.g. air, is introduced to chamber 30 expanding membrane 28 (broken lines FIG. 2). The disc 10 thus being secured in position for measurements, power and monitoring means 86 are then connected via female plug 84 at terminals 78, 80 and measurements made.

The dimensions given are by way of illustration only and are not intended in any way as limitations. Although but a single preferred embodiment of this invention has been described, other embodiments will occur to those skilled in the art which are within the spirit and scope of the appended claims.

What is claimed is:

1. Sensing apparatus for sensitive measurements comprising:
   a support member having first and second generally opposed surfaces;
   a sensing element secured to said support member and having a sensing portion disposed adjacent said first surface; and
   a resilient member secured over said second surface to form a chamber between said resilient member and said support member;
   said support member including a passage from said chamber through said support member to an outer surface of said support member;
   whereby a pressurized fluid may be introduced through said passage to said chamber to expand said resilient member for urging said sensing portion into a secured position relative to material to be sensed.

2. The apparatus claimed in claim 1 including a tubular member secured at one end to said passage and extending at its other end to a position remote from said support member for supplying therethrough said pressurized fluid.

3. The apparatus claimed in claim 2 including at least one lead connected to and extending from said sensing element into and through said passage and into and through said tubular member and connector means connected to the other end of said tubular member and having an opening thereto adapted for connection to a remote source of said pressurized fluid.

4. The apparatus claimed in claim 3 including a pair of terminals on said connector means and a pair of leads connected to said sensing element and extending therefrom into and through said passage, into and through said tubular member, through a wall of said tubular member at said connector means, and through said connector means to said terminals whereby said connector means is also adapted for connection to an electrical power source for energizing said sensing element and to monitoring means for monitoring an electrical signal from said sensing element.

5. Sensing apparatus for sensitive measurements comprising:
   a support member having first and second generally opposed surfaces and a wall thereabout between said surfaces;
   a bore extending through said supoprt member from said first to said second surfaces;
   a sensing element in and secured to said bore, said element having a cathode and an anode with a sensing portion exposing said anode and cathode adjacent said first surface;
   a seal member between said second surface and the adjacent walls of said bore and said sensing element;
   a resilient member secured over said second surface to form a chamber between said resilient member and said support member;
   said support member including a passage spaced from that portion of said bore away from said seal member and extending from said chamber through said support member to an outside surface of said supporting member;
   whereby a pressurized fluid may be introduced through said passage to said chamber to expand said resilient member for urging said sensing portion into a secured position relative to material to be sensed.

6. The apparatus claimed in claim 5 in which said sensing element is recessed from second surface, said seal member extends across said bore, and said passage extends through said seal member to said chamber.

7. The apparatus claimed in claim 6 in which said support member is a disc and said bore is coaxial therewith and further including a groove about said wall between said passage and said second surface and an O-ring in said groove, said resilient member being secured over said second surface by said O-ring.

8. The apparatus claimed in claim 7 including a tubular member secured at one end to said passage and extending at its other end to a position remote from said support member for supplying therethrough said pressurized fluid.

9. The apparatus claimed in claim 8 including at least one lead connected to an extending from said sensing element into and through said passage and into and through said tubular member.

10. The apparatus claimed in claim 8 including connector means connected to said other end of said tubular member and having an opening thereto adapted for connection at said opening to a remote source of said pressurized fluid.

11. The apparatus claimed in claim 10 including a pair of terminals on said connector means and a pair of leads connected to said sensing element and extending therefrom in said seal member into and through said passage, through a wall of said tubular member at said connector means, and through said connector means to said terminals whereby said connector means is also adapted for connection to an electrical power source for energizing said sensing element and to monitoring means for monitoring an electrical signal from said sensing element.

12. Sensing apparatus comprising:
- a disc support member having first and second generally opposed surfaces and a wall thereabout between said surfaces;
- a coaxial bore through said disc from said first to said second surface;
- a first counterbore from said first surface coaxial with said bore;
- a second counterbore from said second surface coaxial with said bore;
- a cylindrical sensing element coxially secured in and to said bore, said sensing element having an axial cathode, spaced therefrom a coaxial anode sleeve thereabout and a sensing portion exposing said cathode and anode adjacent said first surface, said anode having a groove thereabout in said first counterbore thereby being adapted for receiving therein an O-ring to secure membrane of material pervious to a substance to be measured and impervious to other substances across said sensing portion, and said sensing element being recessed in said second counterbore from said second surface;
- an insulating seal member in said second counterbore extending thereacross over said sensing element adadjacent said second surface;
- a groove in said wall whereby an elastomeric membrane extending across said second surface into said groove thereby to form a chamber between said membrane and said disc may be secured to said disc by an O-ring overlying said mebrane in said groove;
- a passage spaced from said first counterbore extending from said chamber through said seal member in said second counterbore and said disc to said wall between said groove and said first surface;
- whereby a pressurized fluid may be introduced through said passage to said chamber to expand said elastomeric member for urging said sensing portion into a secured position relative to material to be sensed.

13. The apparatus claimed in claim 12 including leads connected to said cathode and anode, said leads extending therefrom in said seal member to and through said passage to said wall.

14. The apparatus claimed in claim 13 including a tubular member secured at one end to said passage connector, a connector member connected to said other end of said tubular member having an opening thereto adapted for connection to a source of said pressurized fluid and having terminals adapted for connection to a power source for energizing said element and to monitoring means for monitoring an electrical signal from said element, said leads extending from said passage, through said tubular member to said connector member, through a wall of said tubular member and through said connector member to said terminals.

15. Sensing apparatus for sensitive measurements comprising:
- a support member having first and second generally opposed surfaces;
- a sensing element secured to said support member and having a sensing portion disposed adjacent said first surface;
- means for securing a resilient member over said second surface whereby a chamber may be formed between said resilient member and said support member;
- said support member including a passage from said chamber through said support member to an outer surface of said support member;
- said apparatus thereby being adapted on assembly of said resilient member thereon to have a pressurized fluid introduced through said passage to said chamber to expand said resilient member for urging said sensing portion into a secured position relative to material to be sensed.

References Cited
UNITED STATES PATENTS 3,099,262  7/1963  Bigliano _____ 128—2.05
3,189,023  6/1965  Salz et al. _____ 128—2.05

L. W. TRAPP, Primary Examiner

U.S. Cl. X.R.

136—221; 324—65, 158